US011343671B2

United States Patent
Du et al.

(10) Patent No.: US 11,343,671 B2
(45) Date of Patent: May 24, 2022

(54) HANDLING OF PDCP DUPLICATION AND DATA RECOVERY IN NEW RADIO ACCESS TECHNOLOGY

(71) Applicant: Nokia Technologies Oy, Espoo (FI)

(72) Inventors: Lei Du, Beijing (FI); Benoist Pierre Sebire, Tokyo (JP); Chunli Wu, Beijing (FI); Guillaume Decarreau, Munich (DE)

(73) Assignee: Nokia Technologies Oy, Espoo (FI)

( * ) Notice: Subject to any disclaimer, the term of this patent is extended or adjusted under 35 U.S.C. 154(b) by 37 days.

(21) Appl. No.: 16/496,274

(22) PCT Filed: Mar. 24, 2017

(86) PCT No.: PCT/CN2017/078101
§ 371 (c)(1),
(2) Date: Sep. 20, 2019

(87) PCT Pub. No.: WO2018/170891
PCT Pub. Date: Sep. 27, 2018

(65) Prior Publication Data
US 2020/0037151 A1  Jan. 30, 2020

(51) Int. Cl.
*H04W 4/00* (2018.01)
*H04W 8/30* (2009.01)
(Continued)

(52) U.S. Cl.
CPC ............ *H04W 8/30* (2013.01); *H04L 5/0098* (2013.01); *H04W 28/04* (2013.01); *H04W 80/02* (2013.01);
(Continued)

(58) Field of Classification Search
CPC ..... H04W 8/30; H04W 5/0098; H04W 28/04; H04W 80/02; H04W 80/08; H04W 76/27; H04L 1/1812
(Continued)

(56) References Cited

U.S. PATENT DOCUMENTS 8,605,674 B2  12/2013  Park et al.
8,902,817 B2  12/2014  Wu et al.
(Continued)

FOREIGN PATENT DOCUMENTS

| CN | 105580419 A | 5/2016 | |
| CN | 108924948 A | * 11/2018 | ............ H04W 76/15 |
| WO | 2009/009532 A2 | 1/2009 | |
| WO | 2014/185953 A1 | 11/2014 | |

OTHER PUBLICATIONS

Intel Corporation (R2-1700336, Packet duplication for URLLC in DC and CA deployment, 3GPP TSG-RAN WG2 NR Ad-hoc , Spokane, Washington, USA, Jan. 17-19, 2017) (Year: 2017).*
(Continued)

*Primary Examiner* — Maharishi V Khirodhar
(74) *Attorney, Agent, or Firm* — Harrington & Smith (57) ABSTRACT

In accordance with the example embodiments of the invention there is at least a method and apparatus to performing determining, by a device of a communication network, that at least one PDCP PDU of a PDCP sublayer is duplicated for transmission over at least one logical channel; signaling to an RLC sublayer an indication of the at least one PDCP PDU that is duplicated; and based on the signaling, controlling duplication of the at least one PDCP PDU for transmission over the at least one logical channel. Further, performing receiving, at a device of a communication network, an indication through a received signaling indicating that at least one PDCP PDU of a PDCP sublayer is to be duplicated; determining to duplicate the at least one PDCP PDU;
(Continued)

duplicating the at least one PDCP PDU based on the determination; and transmitting the duplicated PDCP PDU over at least one logical channel.

21 Claims, 6 Drawing Sheets

(51) Int. Cl.
| | |
|---|---|
| *H04L 5/00* | (2006.01) |
| *H04W 28/04* | (2009.01) |
| *H04W 80/08* | (2009.01) |
| *H04W 80/02* | (2009.01) |
| *H04W 76/27* | (2018.01) |
| *H04L 1/18* | (2006.01) |

(52) U.S. Cl.
CPC .......... *H04W 80/08* (2013.01); *H04L 1/1812* (2013.01); *H04W 76/27* (2018.02)

(58) Field of Classification Search
USPC ......................................................... 370/329
See application file for complete search history.

(56) References Cited

U.S. PATENT DOCUMENTS

| | | | |
|---|---|---|---|
| 8,964,539 | B2 | 2/2015 | Susitaival et al. |
| 2009/0097425 | A1 | 4/2009 | Sammour et al. |
| 2010/0309788 | A1* | 12/2010 | Ho ................... H04W 28/0205 370/236 |
| 2011/0188377 | A1* | 8/2011 | Kim ................... H04L 49/9021 370/235 |
| 2013/0242859 | A1 | 9/2013 | Celik et al. |
| 2016/0241685 | A1 | 8/2016 | Shah et al. |
| 2018/0279262 | A1* | 9/2018 | Babaei ................. H04W 72/04 |
| 2020/0322256 | A1* | 10/2020 | Tang ....................... H04L 45/24 |

OTHER PUBLICATIONS

"3rd Generation Partnership Project; Technical Specification Group Radio Access Network; Study on New Radio Access Technology; Radio Interface Protocol Aspects (Release 14)", 3GPP TR 38.804 V0.4.0, Nov. 2016, pp. 1-30.

"New SID Proposal: Study on New Radio Access Technology", 3GPP TSG RAN Meeting #71, RP-160671, Agenda Item: 9.1, NTT DOCOMO, Mar. 7-10, 2016, 8 pages.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.1.0, Dec. 2016, pp. 1-654.

"Packet Duplication at PDCP", 3GPP TSG-RAN WG2 Meeting #97, R2-1701186, Agenda Item: 10.2.1.2, InterDigital Communications, Feb. 13-17, 2017, pp. 1-2.

"Further Aspects of Data Duplication in PDCP Layer", 3GPP TSG-RAN WG2 #97, R2-1700834, Agenda Item: 10.2.1.2, Ericsson, Feb. 13-17, 2017, pp. 1-3.

"Packet Duplication in PDCP", 3GPP TSG-RAN WG2 #97, R2-1701462, Agenda item: 10.2.1.2 (FS_NR_newRAT), LG Electronics Inc., Feb. 13-17, 2017, pp. 1-2.

"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.1.0, Dec. 2016, pp. 1-98.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.1.0, Dec. 2016, pp. 1-317.

"3rd Generation Partnership Project; Technical Specification Group Radio Access Network; Evolved Universal Terrestrial Radio Access (E-UTRA); Packet Data Convergence Protocol (PDCP) specification (Release 14)", 3GPP TS 36.323 V14.1.0, Dec. 2016, pp. 1-39.

International Search Report and Written Opinion received for corresponding Patent Cooperation Treaty Application No. PCT/CN2017/078101, dated Jun. 28, 2017, 11 pages.

Extended European Search Report received for corresponding European Patent Application No. 17901446.9, dated Jul. 30, 2020, 7 pages.

"Packet Duplication for URLLC in DC and CA Deployment", 3GPP TSG-RAN WG2 NR Ad-hoc, R2-1700336, Agenda : 3.2.1.2, Intel Corporation, Jan. 17-19, 2017, pp. 1-3.

* cited by examiner

HANDLING OF PDCP DUPLICATION AND DATA RECOVERY IN NEW RADIO ACCESS TECHNOLOGY

CROSS-REFERENCE TO RELATED APPLICATION

This application was originally filed as Patent Cooperation Treaty Application No. PCT/CN2017/078101 filed Mar. 24, 2017.

TECHNICAL FIELD

The teachings in accordance with the exemplary embodiments of this invention relate generally to a novel methods and apparatus to address handling of Packet duplication and MAC control at a PDCP sublayer and, more specifically, relate to improving handling of PDCP packet duplication and MAC control for duplicate activation, deactivation, and data recovery.

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
AM Acknowledged Mode
ARQ Automatic Repeat request
C-plane Control plane
U-plane User plane
CPT Control PDU Type
HARQ Hybrid ARQ
LCH Logical Channel
LCP Logical Channel Prioritization
MAC Medium Access Control
MCG Master Cell Group
NR New Radio
OTA Over-the-Air
P Poll bit
PCell Primary Cell
PDCP Packet Data Convergence Protocol
PDU Protocol Data Unit
R Reserved bit
RLC Radio Link Control
RLF Radio Link Failure
SC Segmentation Control
SCell Secondary Cell
SDU Service Data Unit
SN Sequence Number
TB Transport Block
UM Unacknowledged Mode In LTE, the radio protocols for the user plane currently consists of three layers: Packet Data Convergence Protocol (PDCP), Radio Link Control (RLC) and Medium Access Control (MAC).

The main services or functions of the PDCP sublayer for example include: header compression and decompression, transfer of user data and ciphering & deciphering as well as timer-based SDU discard. When dual connectivity is configured, for a split bearer, PDCP also performs reordering in a continuous manner. These functions rely on a PDCP SN in the PDCP header of each PDCP PDU.

In addition, a study item on New Radio Access Technology (NR) has been agreed. One goal of NR is to support the very high bit rates required for 5G. In order to support such bit rates, it was agreed to move concatenation to MAC and reordering to PDCP, leaving to RLC the main functions of error correction and segmentation/re-assembly. Furthermore, to increase reliability as well as potentially decrease latency, packet duplication of packets at the PDCP sublayer was agreed.

However, it is noted that without proper controls a duplication of packets at the PDCP sublayer can lead to possible inefficiencies in RLC operation in AM or UM mode.

The example embodiments of the invention as described herein at least provide novel controls and apparatus to address at least the possible inefficiencies of duplication of packets at the PDCP sublayer as discussed above.

SUMMARY

This section contains examples of possible implementations and is not meant to be limiting.

In one example embodiment of the invention there is a method comprising: determining, by a device of a communication network, that at least one PDCP PDU of a PDCP sublayer is to be duplicated for transmission over at least one logical channel; signaling an indication that the at least one PDCP PDU is to be duplicated; and based on the signaling, controlling duplication of the at least one PDCP PDU for transmission over the at least one logical channel.

In another example embodiment of the invention there is a method comprising: receiving, at a device of a communication network, an indication through a received signaling indicating that at least one PDCP PDU of a PDCP sublayer is to be duplicated; determining to duplicate the at least one PDCP PDU; duplicating the at least one PDCP PDU based on the determination; and transmitting the duplicated PDCP PDU over at least one logical channel.

In a further example embodiment of the methods of the paragraphs above, the indication is per PDCP PDU, per radio bearer or per logical channel. In another example embodiment of the methods of the paragraphs above, the signaling comprises a MAC control element, and wherein the MAC control element comprises a bitmap of bits configured to control whether PDCP PDU duplication should be turned on or off for each radio bearer or logical channel of the at least one logical channel. In a further example embodiment of the methods of the paragraphs above, the determining, at least one of signaling the MAC control element to a wireless device of the communication network to turn on/off duplication for an uplink radio bearer or logical channel, and signaling the MAC control element to an eNB of the communication network to turn on/off duplication for an uplink radio bearer or logical channel.

In another example embodiment of the methods of the paragraphs above, the MAC control element is based on indications comprising at least one of a HARQ performance indication as compared to a threshold, at least one determined gap in a received sequence of PDCP or RLC PDUs, maximum RLC retransmission number reached for a logical channel of a duplicated radio bearer, received metrics indicating reliability, and latency performance as compared to a threshold. In a further example embodiment of the methods of the paragraphs above, there is, in response to the signaling the MAC control element, starting a prohibit timer to prohibit signaling of another MAC control element while the prohibit timer is running. In still another example embodiment of the methods of the paragraphs above, the MAC control element is applied to a subset of at least one Secondary cell associated with the radio bearer. In a further example embodiment of the methods of the paragraphs above, the subset of at least one Secondary cell is configured to allow duplication.

In an additional example embodiment of the methods of the paragraphs above, wherein the MAC control element turning on or off duplication for the subset of at least one Secondary cell configured to allow duplication by or through RRC signaling. In a further example embodiment of the methods of the paragraphs above, the determining comprises determining that at least one PDCP PDU was transmitted over a logical channel of the at least logical channel and has not been acknowledged. In another example embodiment of the methods of the paragraphs above, there is controlling transmission of the at least one PDCP PDU over another logical channel of the at least one logical channel, wherein the transmission is performed in an order of a count value associated with the at least one PDCP PDU. In a further example embodiment of the methods of the paragraphs above, the at least one PDCP PDU determined to be duplicated is located in a buffer of the device. In a further example embodiment of the methods of the paragraphs above, the determining is based on at least one of that a logical channel for the transmission has been added, and that duplication is enabled at the device In a further example embodiment of the methods of the paragraphs above, the PDCP sublayer is configured by RRC to control duplication of the at least one PDCP PDU for transmission over the at least one Logical Channel when at least one of that a logical channel for the transmission has been added, and duplication is enabled at the device. In a further example embodiment of the methods of the paragraphs above, the signaling is to a wireless device of a communication network, and wherein the signaling is performed using RLC signaling associated with one of an acknowledged mode or unacknowledged mode of a radio bearer associated with the at least one logical channel. In still another example embodiment of the methods of the paragraphs above, the device is embodied in one of a user equipment and base station of the communication network.

In another example embodiment of the invention there is apparatus comprising: at least one processor; and at least one memory including computer program code, where the at least one memory and the computer program code are configured, with the at least one processor, to cause the apparatus to at least: determine that at least one PDCP PDU of a PDCP sublayer is to be duplicated for transmission over at least one logical channel; signal an indication of the at least one PDCP PDU that is a duplicate; and based on the signaling, control duplication of the at least one PDCP PDU for transmission over the at least one logical channel.

In still another example embodiment of the invention there is apparatus comprising: at least one processor; and at least one memory including computer program code, where the at least one memory and the computer program code are configured, with the at least one processor, to cause the apparatus to at least: receive an indication through a received signaling indicating that at least one PDCP PDU of a PDCP sublayer is to be duplicated; determine to duplicate the at least one PDCP PDU; duplicate the at least one PDCP PDU based on the determination; and transmit the duplicated PDCP PDU over at least one logical channel.

In a further example embodiment of the apparatus of the paragraphs above, the indication is signaled per PDCP PDU or per logical channel. In another example embodiment of the apparatus of the paragraphs above, the signaling comprises signaling a MAC control element towards the communication network, and wherein the MAC control element comprises a bit map of bits configured to control whether PDCP PDU duplication should be turned on or off for each for each radio bearer or logical channel of the at least one logical channel. In a further example embodiment of the apparatus of the paragraphs above, the at least one memory including the computer program code is configured with the at least one processor to cause the apparatus, based on the determining, to at least one of signal the MAC control element to a wireless device of the communication network to turn on/off duplication for an uplink radio bearer or logical channel, and signaling the MAC control element to an eNB of the communication network to turn on/off duplication on an uplink radio bearer or logical channel. In a further example embodiment of the apparatus of the paragraphs above, the MAC control element is based on indications comprising at least one of a HARQ performance indication from the wireless device as compared to a threshold, at least one determined gap in a received sequence of PDCP or RLC PDUs, maximum RLC retransmission number reached for a logical channel of a duplicated radio bearer, received metrics indicating reliability, and latency performance as compared to a threshold. In a further example embodiment of the apparatus of the paragraphs above, the at least one memory including the computer program code is configured with the at least one processor to cause the apparatus, in response to the signaled MAC control element, to start a prohibit timer to prohibit signaling of another MAC control element while the prohibit timer is running. In another example embodiment of the apparatus of the paragraphs above, the MAC control element is applied to a subset of at least one Secondary cell associated with the radio bearer. In yet another example embodiment of the apparatus of the paragraphs above, the subset of at least one configured Secondary cell is configured to allow duplication by or through RRC signaling.

In a further example embodiment of the apparatus of the paragraphs above, wherein the MAC control element uses RRC signaling to turn on or off duplication for the subset of at least one Secondary cell configured to allow duplication by or through RRC signaling. In another example embodiment of the apparatus of the paragraphs above, the determining comprises determining that at least one PDCP PDU was transmitted over a logical channel of the at least one logical channel and has not been acknowledged. In a further example embodiment of the apparatus of the paragraphs above, the controlling comprises: controlling transmission of the at least one PDCP PDU over another logical channel of the at least one logical channel, wherein the transmission is performed in an order of a count value associated with the at least one PDCP PDU.

In a further example embodiment of the apparatus of the paragraphs above, the at least one PDCP PDU determined to be duplicated is located in a buffer of the device. In a further example embodiment of the apparatus of the paragraphs above, the determining is based on at least one of that a logical channel for the transmission has been added, and that duplication is enabled at the device. In another example embodiment of the apparatus of the paragraphs above, the PDCP sublayer is configured by RRC to control duplication of the at least one PDCP PDU for transmission over the at least one logical channel when at least one of that a logical channel for the transmission has been added, and duplication is enabled at the device. In a further example embodiment of the apparatus of the paragraphs above, the apparatus is embodied in one of a user equipment and base station of the communication network.

In another example embodiment of the invention there is apparatus comprising: means for determining that at least one PDCP PDU of a PDCP sublayer is to be duplicated for transmission over at least one logical channel; means for signaling an indication that the at least one PDCP PDU is to be duplicated; and means, based on the signaling, for controlling duplication of the at least one PDCP PDU for transmission over the at least one logical channel.

In yet another example embodiment of the invention there is apparatus comprising: means for receiving an indication through a received signaling indicating that at least one PDCP PDU of a PDCP sublayer is to be duplicated; means for determining to duplicate the at least one PDCP PDU; means for duplicating the at least one PDCP PDU based on the determination; and means for transmitting the duplicated PDCP PDU over at least one logical channel.

In accordance with the example embodiments the apparatus of the paragraphs above is embodied in one of a user equipment and a base station of a communication network.

In another example embodiment of the invention there is a computer program embodied on a non-transitory memory, the computer program executed by at least one processor to cause determining that at least one PDCP PDU of a PDCP sublayer is to be duplicated for transmission over at least one logical channel; signaling an indication that the at least one PDCP PDU is to be duplicated; and based on the signaling, controlling duplication of the at least one PDCP PDU for transmission over the at least one logical channel.

In another example embodiment of the invention there is a computer program embodied on a non-transitory memory, the computer program executed by at least one processor to cause receiving, at a device of a communication network, an indication through a received signaling indicating that at least one PDCP PDU of a PDCP sublayer is to be duplicated; determining to duplicate the at least one PDCP PDU; duplicating the at least one PDCP PDU based on the determination; and transmitting the duplicated PDCP PDU over at least one logical channel.

In another example embodiment of the invention there is a method comprising: determining, at a device, at least one PDCP PDU of a PDCP sublayer is to be duplicated; signaling an indication indicating the at least one PDCP PDU is to be duplicated based on the determination; and receiving a duplication of the at least one PDCP PDU over at least one logical channel as a response to the signaling.

In another example embodiment of the invention there is an apparatus comprising: at least one processor; and at least one memory including computer program code, where the at least one memory and the computer program code are configured, with the at least one processor, to cause the apparatus to at least: determine at least one PDCP PDU of a PDCP sublayer is to be duplicated; signal an indication indicating the at least one PDCP PDU is to be duplicated based on the determination; and receive a duplication of the at least one PDCP PDU over at least one logical channel as a response to the signaling.

In still another example embodiment of the invention there is an apparatus comprising: means for determining at least one PDCP PDU of a PDCP sublayer is to be duplicated; means for signaling an indication indicating the at least one PDCP PDU is to be duplicated based on the determination; and means for receiving a duplication of the at least one PDCP PDU over at least one logical channel as a response to the signaling.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In this invention, we propose novel operations that will improve handling of PDCP packet duplication and MAC control for duplicate activation, deactivation, and data recovery.

Figure 1A:
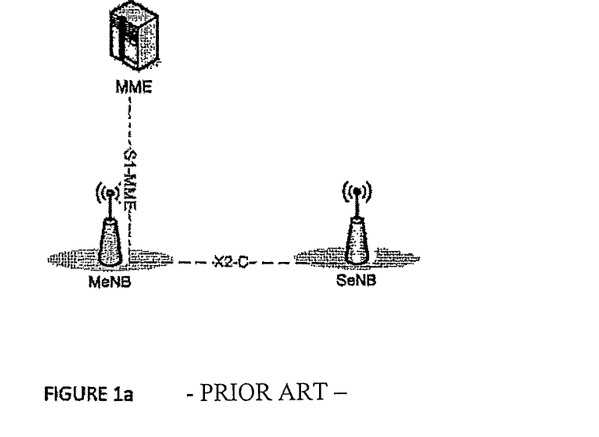
FIG. 1a shows C-Plane connectivity of eNBs involved in Dual Connectivity as in FIG. 4.9.3.1-1 of 3GPP TS 36.300 V14.1.0 (2016-12)

FIG. 1a shows FIG. 4.9.3.1-1 of 3GPP TS 36.300 V14.1.0 (2016-12) which shows a C-plane connectivity of eNBs involved in DC for a certain UE. As shown in FIG. 1 there is an S1-MME interface terminated at the MeNB, and the MeNB and the SeNB are interconnected via X2-C. The S1-MME interface supports a many-to-many relationship between MME/S-GW and eNBs.

Figure 1B:
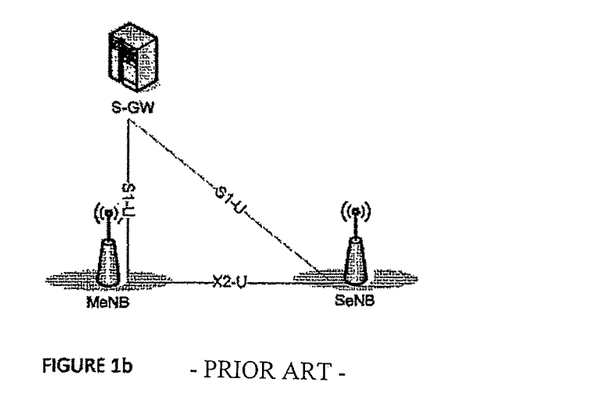
FIG. 1b shows U-Plane connectivity of eNBs involved in Dual Connectivity.

FIG. 1b shows U-plane connectivity of eNBs involved in dual connectivity. As shown in FIG. 1b for a "split bearer" the Master eNB (MeNB) can be U-plane connected to the S-GW via S1-U, and in addition the MeNB is interconnected to a Secondary eNB (SeNB) via X2-U. The routing function in the PDCP layer of the MeNB decides whether a PDCP layer PDU of a split bearer is sent directly over the local air interface to the UE or whether it is forwarded to the SeNB via X2-U.

Referring to FIGS. 1a and 1b as stated above, it is noted that the C-plane (Control Plane) relates to completion of RAN and CN signaling, and U-plane (User Plane) relates to establishment of a bearer path.

Figure 2:
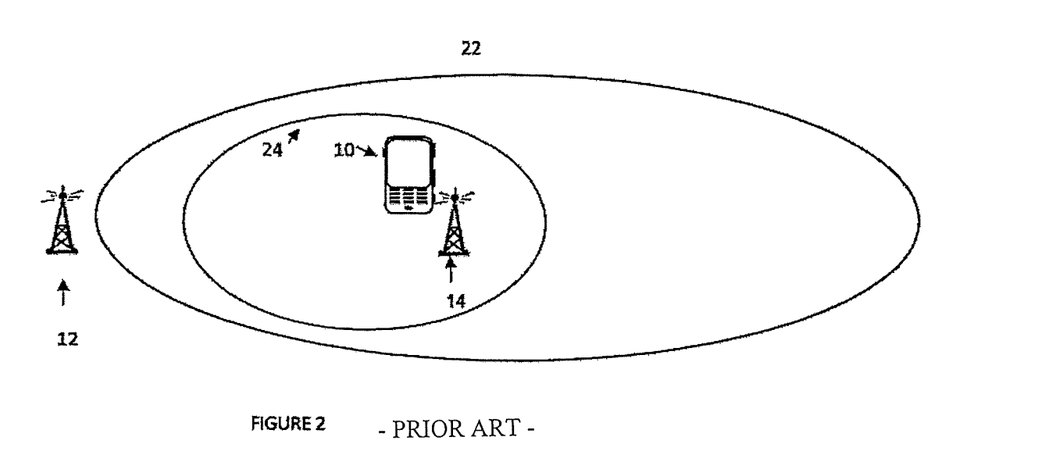
FIG. 2 shows a diagram illustrating an example of a User Equipment (UE) in partially overlapping cells.

Referring also to FIG. 2, a user equipment (UE 10) may be connected to more than one cell at a same time. In this example the UE 10 is connected to a first cell 22 having a base station 12 (such as an eNB or NCE or WLAN access point for example) and a second cell 24 having a base station 14 (eNB or NCE or WLAN access point for example). The two cells 22, 24 are, thus, at least partially overlapping. In one type of example embodiment, the first cell may operate on a licensed band and the second one may operate on an unlicensed band. For simplicity, there are just two cells depicted in the scenario shown in FIG. 2. In other alternate examples any number of cells operating on licensed and/or unlicensed band(s) may be provided to work together for a suitable Carrier Aggregation (CA) or Dual Connectivity.

Dual connectivity is a mode of operation of a UE in RRC_CONNECTED mode, configured with for dual connectivity with a Master Cell Group (MCG) and a Secondary Cell Group (SCG). FIG. 1a and FIG. 1b show the C-plane and U-plane architecture for dual connectivity, respectively.

It is noted that in dual connectivity, there are three types of bearer:

For MCG bearers, the MeNB is U-plane connected to the S-GW via S1-U, the SeNB is not involved in the transport of user plane data.

For split bearers, the MeNB is U-plane connected to the S-GW via S1-U and in addition, the MeNB and the SeNB are interconnected via X2-U.

For SCG bearers, the SeNB is directly connected with the S-GW via S1-U.

Further, in accordance with the example embodiments the base station 12 and/or base station 14 as in FIG. 2 may comprise a Master eNB or Secondary eNB. For the transport of user plane data from the S-GW to the UE so-called "split bearers" may be used. Split bearers provide two or more paths for downlink user plane data. They can either be sent from the S-GW via the "Master eNB (MeNB)" to the UE, or they can be sent from the S-GW via the MeNB to the Secondary eNB (SeNB) which finally sends them to the UE. The example embodiments of the invention can be applied in any of the dual configured or multi connected operations.

In addition, the example embodiments of the invention work with NR Access Technology. As similarly stated above, NR has been agreed that to increase reliability as well as potentially decrease latency, packet duplication of packets at the PDCP sublayer. NR operations can use high bit rates, such as for 5G operations, and in NR a system bandwidth can be aggregated over more than one carrier. In this regard, to increase reliability as well as potentially decrease latency, packet duplication at PDCP was agreed. Furthermore, RAN2 also agreed to investigate redundancy schemes operating below PDCP in CA scenarios for the purpose of meeting the reliability/latency requirements of URLLC (Utra Reliable Low Latency Communications). However, presently none of the standards deal with the combination of duplicates and leg reconfigurations. The Example embodiments of the invention work to address at least these issues.

In accordance with the example embodiments of the invention, a UE and/or base stations and/or other network devices using such split bearers can be configured to perform improved RLC AM operation when duplicates are generated in PDCP, and to perform improved operations using a MAC Control Element for dynamic control of the duplication.

Figure 3A:
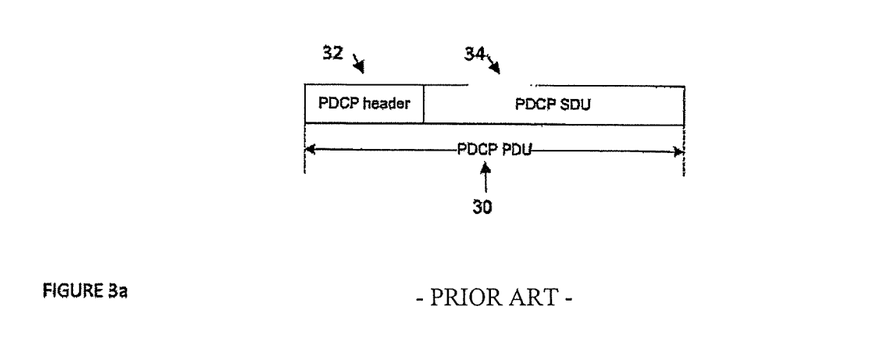
FIG. 3a shows a PDCP PDU Structure.

Further, reference is made to FIG. 3a which shows a PDCP PDU structure. As shown in FIG. 3a there is PDCP PDU 30 which includes a PDCP header 32 and a PDCP SDU payload 34.

In addition, below the PDCP header and payload lies an RLC sublayer. As similarly stated above, the main services or functions of the PDCP sublayers, for example, include: header compression and decompression, transfer of user data and ciphering & deciphering as well as timer-based SDU discard. When dual connectivity is configured for split bearer, PDCP also performs reordering in a continuous manner. Further, the PDCP can also be used packet discarding functionality as described herein. These functions can also rely on information, such as a PDCP SN, in the PDCP header of each PDCP PDU.

The example embodiments of the invention address operations performed in PDCP sublayers. The RLC sublayer for example whose main services and functions include:
Transfer of upper layer PDUs;
Error Correction through ARQ (only for AM data transfer);
Concatenation, segmentation and reassembly of RLC SDUs (only for UM and AM data transfer);
Re-segmentation of RLC data PDUs (only for AM data transfer);
Reordering of RLC data PDUs (only for UM and AM data transfer);
Duplicate detection (only for UM and AM data transfer);
Protocol error detection (only for AM data transfer).

These functions can also rely on an RLC SN in the RLC header of every RLC PDUs.

Figure 3B:
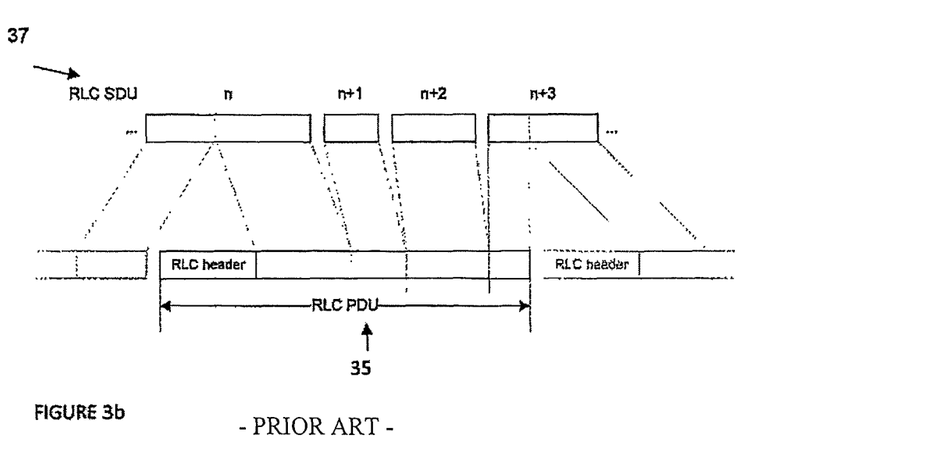
FIG. 3b shows a RLC PDU Structure.

FIG. 3b shows a RLC PDU 35. The RLC structure is a sub layer of the PDCP. As shown in FIG. 3b the RLC PDU 35 includes a RLC SDU 37 As shown in FIG. 3b the RLC SDU 37 includes an indication of duplicates of packets e.g., as n, n+1, n+2, and n+3.

Further, it is noted that below the RLC structure lies the MAC sublayer. The example embodiments of the invention address operations performed in this MAC sublayer. The MAC sublayer whose main services and functions include:
Mapping between logical channels and transport channels;
Multiplexing/demultiplexing of MAC SDUs belonging to one or different logical channels into/from transport blocks (TB) delivered to/from the physical layer on transport channels;
Scheduling information reporting;
Error correction through HARQ;
Priority handling between logical channels of one UE;
Priority handling between UEs by means of dynamic scheduling;
Transport format selection; and
Padding.

Further, it is noted that to ensure diversity in CA case, it has been suggested to introduce logical channel mapping restrictions in LCP.

Relevant specification excerpts from the standards regarding the points above, and to which the example embodiments can be implemented, include:
3GPP TS 36.323 V14.1.0 (2016-12):
5.1.1 UL Data Transfer Procedures
At reception of a PDCP SDU from upper layers, the UE shall:
start the discardTimer associated with this PDCP SDU (if configured);
For a PDCP SDU received from upper layers, the UE shall:
associate the PDCP SN corresponding to Next_PDCP_TX_SN to this PDCP SDU;
NOTE: Associating more than half of the PDCP SN space of contiguous PDCP SDUs with PDCP SNs, when e.g., the PDCP SDUs are discarded or transmitted without acknowledgement, may cause HFN desynchronization problem. How to prevent HFN desynchronization problem is left up to UE implementation.
perform header compression of the PDCP SDU (if configured) as specified in the subclause 5.5.4;
perform integrity protection (if applicable), and ciphering (if applicable) using COUNT based on TX_HFN and the PDCP SN associated with this PDCP SDU as specified in the subclause 5.7 and 5.6, respectively;
increment Next_PDCP_TX_SN by one;
if Next_PDCP_TX_SN>Maximum_PDCP_SN:
set Next_PDCP_TX_SN to 0;
increment TX_HFN by one;
submit the resulting PDCP Data PDU to lower layer.

Here, when re-establishment occurs the PDCP re-submits for transmission to lower layers all SDUs for which a successful delivery has not been confirmed. The example embodiments of the invention at least work to better dynamically control at least these submission operations.

Further, in 3GPP TS 36.323 V14.1.0 (2016-12):
5.2.1.1 Procedures For DRBs Mapped on RLC AM
When upper layers request a PDCP re-establishment, the UE shall:
reset the header compression protocol for uplink and start with an IR state in U-mode (if configured) [9] [11], except if upper layers indicate stored UE AS con text is used and drb-ContinueROHC is configured [3];
if connected as an RN, apply the integrity protection algorithm and key provided by upper layers (if configured) during the re-establishment procedure;
if upper layers indicate stored UE AS context is used, set Next_PDCP_TX_SN, a nd TX_HFN to 0;
apply the ciphering algorithm and key provided by upper layers during the re-establishment procedure;
from the first PDCP SDU for which the successful delivery of the corresponding PDCP PDU has not been confirmed by lower layers, perform retransmission or transmission of all the PDCP SDUs already associated with PDCP SNs in ascending order of the COUNT values associated to the PDCP SDU prior to the PDCP re-establishment as specified below:
perform header compression of the PDCP SDU (if configured) as specified in the subclause 5.5.4;
if connected as an RN, perform integrity protection (if configured) of the PDC P SDU using the COUNT value associated with this PDCP SDU as specified in the subclause 5.7;
perform ciphering of the PDCP SDU using the COUNT value associated with this PDCP SDU as specified in the subclause 5.6;
submit the resulting PDCP Data PDU to lower layer.

This provides lossless delivery when lower layers are re-established e.g. during handover.

In addition, for dual connectivity a PDCP data recovery procedure (which retransmits all PDUs for which the successful delivery has not been confirmed by lower layers) is triggered for split bearer to also guarantee lossless delivery when lower layers are re-established e.g. during SCG change, or SCG release.

In 3GPP TS 36.323 V14.1.0 (2016-12):
5.9 PDCP Data Recovery Procedure
When upper layers request a PDCP Data Recovery for a radio bearer, the UE shall:
if the radio bearer is configured by upper layers to send a PDCP status report in the uplink (statusReportRequired [3]), compile a status report as described in subclause 5.3.1, and submit it to lower layers as the first PDCP PDU for the transmission;
perform retransmission of all the PDCP PDUs previously submitted to re-established AM RLC entity in ascending order of the associated COUNT values from the first PDCP PDU for which the successful delivery has not been confirmed by lower layers.

After performing the above procedures, the UE shall follow the procedures in subclause 5.1.1 (as stated above).

It is noted that not all the procedures above take the occurrence of duplicates into account. That is, when a leg is reconfigured and the lower layers of that leg are re-established, PDCP will try to retransmit all the PDCP PDUs of the leg, from the first PDCP SDU for which the successful delivery of the corresponding PDCP PDU has not been confirmed by lower layers, perform retransmission or transmission. If any of those PDUs are duplicates, there is no guarantee that they will end up on a different leg than the original PDUs.

The example embodiments of the invention at least work to better dynamically control at least the standards based re-transmission, transmission, and data recovery operations as disclosed herein.

Another problem is the activation of PDCP PDU duplication: this feature is activated when more reliability is needed for the transmission, in case for example of bad radio conditions. If nothing specific is done, only the new PDU scheduled for transmission will be duplicated and the PDU that are already sent to lower layers will not be duplicated. This would mean that the PDU awaiting in the buffers will not benefit from duplication although the radio conditions are already bad and would require duplication.

In 3GPP TS 36.321 V14.1.0 (2016-12):
6.1.3.8 Activation/Deactivation MAC Control Elements
The Activation/Deactivation MAC control element of one octet is identified by a MAC PDU subheader with LCID as specified in table 6.2.1-1. It has a fixed size and consists of a single octet containing seven C-fields and one R-field. The activation/Deactivation MAC control element with one octet is defined as follows (FIG. 6.1.3.8-1).

Figure 3C:
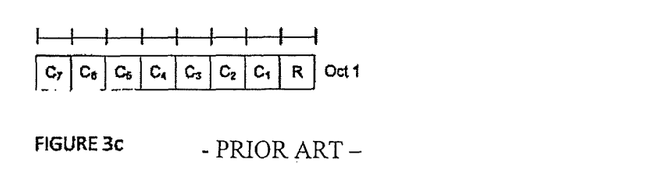
FIG. 3c shows FIG. 6.1.3.8-1 of 3GPP TS 36.321 V14.1.0 (2016-12): Activation/Deactivation MAC control element of one octet.

FIG. 3c recreates FIG. 6.1.3.8-1 of 3GPP TS 36.321 V14.1.0 (2016-12): Activation/Deactivation MAC control element of one octet.

The Activation/Deactivation MAC control element of four octets is identified by a MAC PDU subheader with LCID as specified in table 6.2.1-1. It has a fixed size and consists of a four octets containing 31 C-fields and one R-field.

The Activation/Deactivation MAC control element of four octets is defined as follows (FIG. 6.1.3.8-2).

Figure 3D:
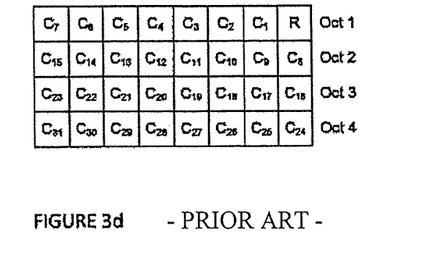
FIG. 3d shows FIG. 6.1.3.8-2 of 3GPP TS 36.321 V14.1.0 (2016-12): Activation/Deactivation MAC control element of four octets.

FIG. 3d recreates FIG. 6.1.3.8-2 of 3GPP TS 36.321 V14.1.0 (2016-12): Activation/Deactivation MAC control element of four octets.

For the case with no serving cell with a ServCellIndex [8] larger than 7, Activation/Deactivation MAC control element of one octet is applied, otherwise Activation/Deactivation MAC control element of four octets is applied.

$C_i$: if there is an SCell configured with SCellIndex i as specified in [8], this field indicates the activation/deactivation status of the SCell with SCellIndex i, else the MAC entity shall ignore the $C_i$ field. The $C_i$ field is set to "1" to indicate that the SCell with SCellIndex i shall be activated. The $C_i$ field is set to "0" to indicate that the SCell with SCellIndex i shall be deactivated;
R: Reserved bit, set to "0".

Figure 3E:
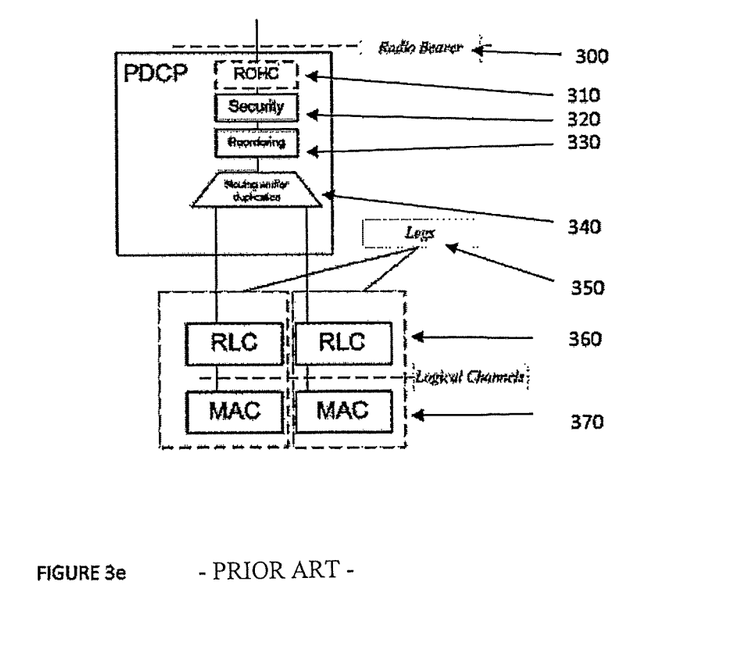
FIG. 3e shows a Radio Bearer including a PDCP sublayer feeding into a two logical channels or legs of a radio bearer.

FIG. 3e shows a Radio Bearer including a PDCP sublayer feeding into a two logical channels or legs of a radio bearer. As shown in FIG. 3e the Radio Bearer 300 includes a PDCP sublayer with elements for Robust Header Compression (ROHC) 310, Security 320, reordering 330, and Routing and/or Duplication functions. As shown in FIG. 3e PDCP PDUs are sent or received via two legs 350 of a radio bearer. Each of the legs includes an RLC 360 and MAC 370 sublayers. The Example embodiments of the invention can be applied to an advantage in such a radio bearer. In accordance with the example embodiments the MAC can be common to more than one logical channels.

Example embodiments of the invention include PDCP operations to inform RLC of a device which RLC SDUs submitted for communication can be considered as duplicates.

An example embodiment of the invention relates improved operations of a MAC control element to dynamically control and/or apply duplication at the PDCP to address at least the shortfalls of present standards as indicated above.

Another example embodiment of the invention relates to, in addition to applying duplication to new PDCP PDUs, to also duplicate PDCP PDUs that are still in the buffers awaiting acknowledgment from lower layers.

Figure 4:
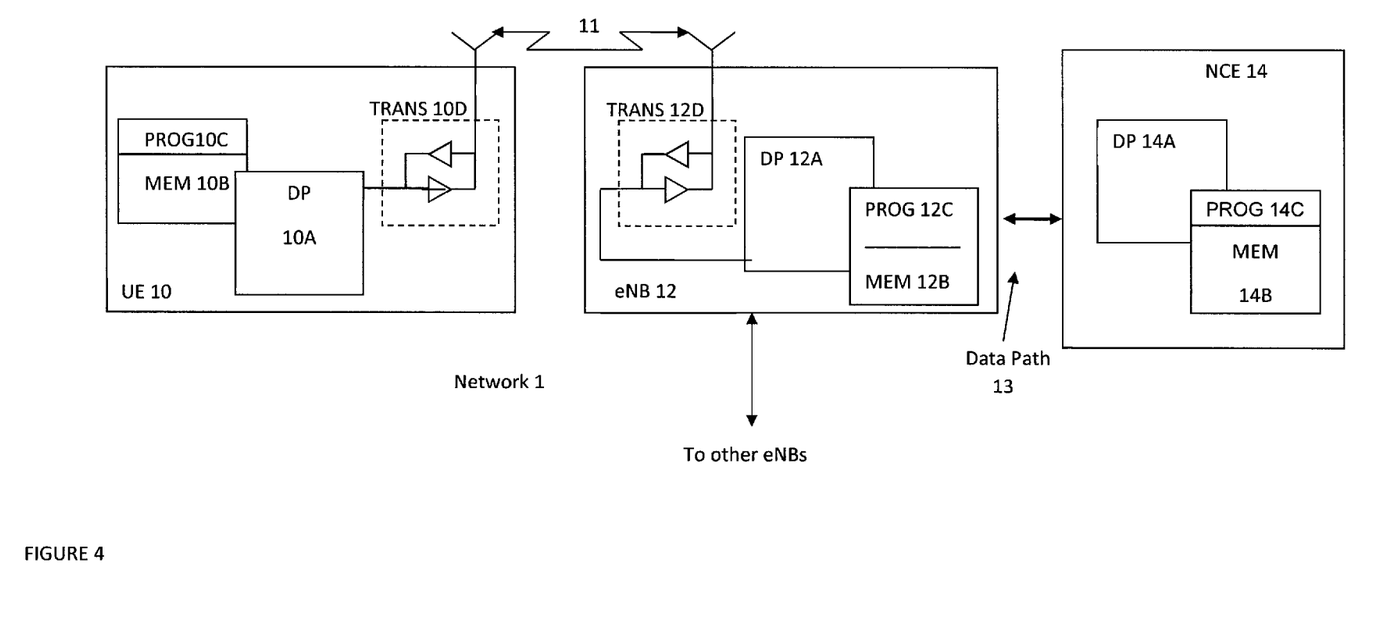
FIG. 4 shows a simplified block diagram of various electronic devices that are suitable for use in practicing the exemplary embodiments of this invention.

Before describing in further detail the exemplary embodiments of this invention, reference is made to FIG. 4 for illustrating a simplified block diagram of various electronic devices and apparatus that are suitable for use in practicing the exemplary embodiments of this invention.

In FIG. 4 a wireless network 1 is adapted for communication over a wireless link 11 with an apparatus, such as a mobile communication device which may be referred to as a UE 10, via a network access node, such as a Node B (base station), and more specifically an eNB 12.

The Network 1 may include a network control element (NCE) 14 that may include the MME/SGW functionality, and which provides connectivity with a further network, such as a telephone network and/or a data communications network (e.g., the internet).

The NCE 14 includes a controller, such as a computer or a data processor (DP) 14A, a computer-readable memory medium embodied as a memory (MEM) 14B that stores a program of computer instructions (PROG) 14C, and a suitable path for communication with the eNB 12 via a data/control path 13 to the eNB 12, which may be implemented as the X2 interface for example.

The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas.

The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The eNB 12 may also be coupled to the NCE 14 via data/control path 15, which may be implemented by a wired or wireless interface for example an X2 interface. In addition, the eNB 12 may include the MME/SGW functionality, and which provides connectivity with a further network, such as a telephone network and/or a data communications network (e.g., the internet). Further, in accordance with the example embodiments the eNB 12 and/or NCE 14 may comprise a Master eNB or Secondary eNB.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

At least one of the PROGs 10C, 12C, and 14C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12 and/or by the DP 14A of the NCE 14, or by hardware, or by a combination of software and hardware (and firmware).

The computer readable MEMs 10B, 12B, and 14B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A, and 14A may be of any type suitable to the local technical environment, and may include one or more of general purpose computers, special purpose computers, microprocessors, digital signal processors (DSPs) and processors based on multi-core processor architectures, as non-limiting examples.

The example embodiments of the invention, address problems that can be caused by packet duplication at PDCP sublayer for multi-connectivity where the same PDCP PDU are sent via two or more different RLC entities using a different transmission path and/or different logical channels.

In accordance with the example embodiments PDCP packet duplication can be configured per UE using higher layer signaling, and duplication for a configured UE can be further controlled by the network through certain criteria. In accordance with the example embodiments PDCP packet duplication can be further controlled so that duplication it may be activated and deactivated dynamically through downlink and/or uplink control signaling, e.g., via MAC CE.

In accordance with another example embodiment logical channels of the different legs may not be permitted to be transmitted on the same transport block. To implement such a restriction there can be reliance on separate MAC entities or introduce mapping rules within one MAC entity. Further reliance for these operations can rely on CA with logical channel restrictions in LCP to ensure that MAC SDUs from the two legs do not end up on the same transport block.

In accordance with a first example embodiment of the invention there is, when PDCP PDU duplication is activated for the first time on existing legs of a multi-connected device or when a leg is added and PDCP PDU duplication is already enabled at the multi-connected device, the PDCP layer sends for transmission to lower layers the PDU that have been sent for transmission to one leg, (and not acknowledged) to the other leg.

In other words, in addition to applying duplication to new PDCP PDUs, the example embodiments of the invention also duplicates PDCP PDUs that are still in the buffers awaiting acknowledgment from lower layers. This requires the transmitter to keep track of which PDU have been sent on which leg in order to always guarantee that duplicates are sent on a different leg.

In accordance with the example embodiments only one leg (e.g., an additional leg) may be allowed to be configured for PDCP duplicates for one radio bearer.

Further, in accordance with the example embodiment, as an alternative, the device can be informed by the network to duplicate new PDCP PDUs only. This can be done through RRC signaling or through a control PDU or linked to the type of RLC mode used: AM or UM.

Duplicate activation/deactivation using MAC control Elements:

For the dynamic control of duplication, it is proposed to rely on a MAC Control Element.

In accordance with the example embodiments of the invention, for duplication control in a downlink, the MAC control element is configured to contain a bitmap which would include one bit per configured radio bearer and/or logical channel instructing a mobile device, such as the UE 10 as in FIG. 4, to either turn duplication on if the associated bit of the MAC control element is set to 1 or turn duplication off if the bit is set to 0.

In accordance with the example embodiments of the invention, for duplication control, for control in an uplink, the MAC control element contains a bitmap with one bit per configured radio bearer and/or logical channel instructing a device, e.g., a gateway device such as the eNB 12 or NCE 14 as in FIG. 4, to either turn duplication on if the associated bit of the MAC control element is set to 1 or turn duplication off if the bit is set to 0. Further, in accordance with an example embodiment the setting of the bit to either 1 or 0 may depend on some predefined criteria signaled to a device, such as the UE 10 or eNB 12 or NCE 14 as in FIG. 4, for instance when:
1. HARQ performance going below a configured threshold, in which case the related bit will be set to 1 (e.g., in number of consecutive NACKs or number of consecutive NACKed transport blocks); and/or
2. Gaps are detected in the received sequence of PDCP or RLC PDUs; and/or
3. Receipt of any metrics reflecting reliability/latency performance going below a configured threshold (e.g. BLER, CQI or RRM measurements).
4. Maximum RLC retransmission number reached for a LCH of a duplicated radio bearer In the downlink, the MAC control element can contain a bitmap with one bit per configured radio bearer/logical channel commanding the device, e.g. a UE such as the UE 10 of FIG. 4, to either turn duplication on (bit set to 1) or off (bit set to 0).

In the uplink, the MAC control element can contain a bitmap with one bit per configured radio bearer/logical channel telling the device, e.g. a gNB such as the eNB 12 or NCE 14 of FIG. 4, whether duplication should be turned on (bit set to 1) or off (bit set to 0).

Further, in accordance with another example embodiment of the invention a prohibit timer can be used to ensure that the UE does not send the MAC control element (CE) too often, e.g., for duplication described. In accordance with the embodiments, the timer can be started after sending the MAC CE for duplication, and as long as the timer is running the device is not allowed to send another MAC CE for duplication.

In addition, in accordance with the example embodiments of the invention, in the context of carrier aggregation (CA), the duplication command can either apply:
a. to all configured Scells (in which case the MAC CE will activate/deactivate duplication on all of the configured SCells);
b. to a subset of the configured SCells which have been configured by RRC signalling as allowing duplication to take place (in which case the MAC CE will only activate/deactivate duplication on a subset of the configured SCells).

The duplication command may also be linked to the activation status of the SCell, and if an SCell is not activated the duplication command could also activate the SCell.

Handling PDCP duplicates:

When PDCP PDU duplication is activated for the first time on existing legs or when a leg is added and PDCP PDU duplication is already enabled, the PDCP layer sends for transmission to lower layers the PDU that have been sent for transmission to one leg, (and not acknowledged) to the other leg.

In other words, in addition to applying duplication to new PDCP PDUs, it is proposed to also duplicate PDCP PDUs that are still in the buffers awaiting acknowledgment from lower layers. This requires the transmitter to keep track of which PDU have been sent on which leg in order to guarantee that duplicates are sent on a different leg always.

Alternatively, a device, such as the UE 10, eNB 12, or NCE 14 of FIG. 4, can be informed or instructed by the network to duplicate new PDCP PDUs only. This can be done through RRC signaling or through a control PDU or linked to the type of RLC mode used: AM or UM.

The following procedures in accordance with the example embodiments of the invention maximize the efficiency of duplication upon activation and leg addition. In addition, the following operations are not limited to a particular network technology. The operations in accordance with the example embodiments as described herein can be applied in 5G networks and can be added in the 5G version of PDCP specifications. These operations can be applied at least:
when a leg is added and packet duplication is enabled; or
when duplication is activated,
from the first PDCP SDU for which the successful delivery of the corresponding PDCP PDU that has been already transmitted via a leg has not been confirmed by lower layers, perform transmission via the other leg of all the PDCP SDUs in ascending order of the COUNT values as disclosed above.

The example embodiments of the invention as described herein can be applied to an advantage in communication operations using carrier aggregation or multi-connectivity.

Figure 5A:
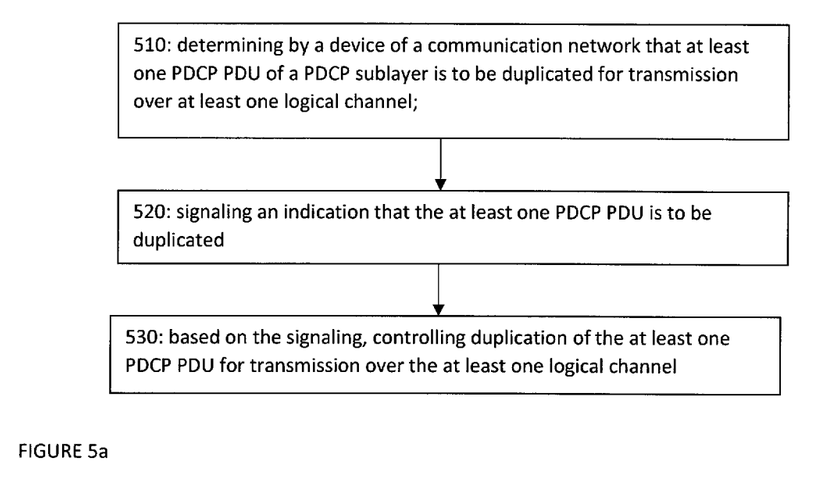
FIGS. 5a and 5b each show a method that can be performed by an apparatus in accordance with example embodiments of the invention.

In regards to FIG. 5a there is illustrated a method and the operation of a computer program product in accordance with an exemplary embodiments of the invention which may be performed by a network device e.g., a wireless device, such as the UE 10, and/or the eNB 12, and/or the NCE 14 as illustrated in FIG. 4. As shown in step 510 of FIG. 5a there is determining by a device of a communication network that at least one PDCP PDU of a PDCP sublayer is to be duplicated for transmission over at least one logical channel. As shown in step 520 of FIG. 5a there is signaling of an indication that the at least one PDCP PDU is to be duplicated. Then as shown in step 530 there is based on the signaling, controlling duplication of the at least one PDCP PDU for transmission over the at least one logical channel.

Figure 5B:
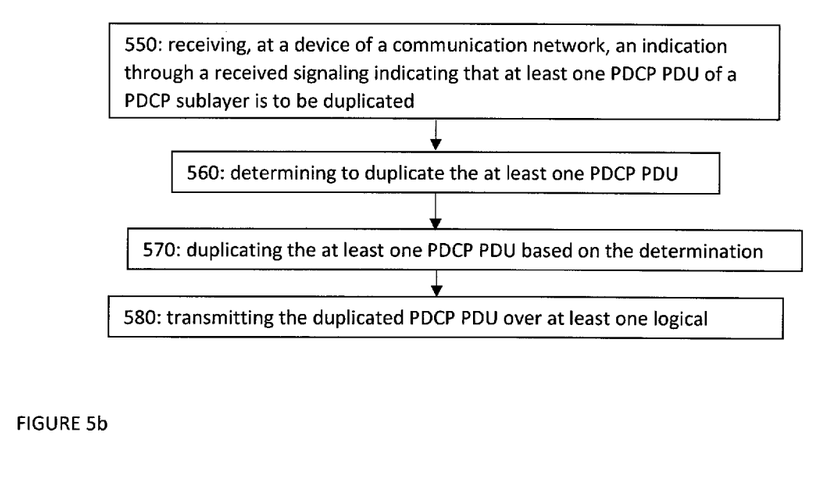

FIG. 5b illustrates further or separate operations which may be performed by a device such as, but not limited to, a device, such as the UE 10, the eNB 12, and/or the NCE 14 as illustrated in FIG. 4. As shown in step 550 of FIG. 5b there receiving, at a device of a communication network, an indication through a received signaling indicating that at least one PDCP PDU of a PDCP sublayer is to be duplicated. As shown in step 560 of FIG. 5b there is determining to duplicate the at least one PDCP PDU. As shown in step 570 of FIG. 5b there is duplicating the at least one PDCP PDU based on the determination. Then as shown in step 580 of FIG. 5b there is transmitting the duplicated PDCP PDU over at least one logical.

In accordance with the example embodiments as described in the paragraphs above, the indication is signaled per PDCP PDU or per radio bearer, or per logical channel.

In accordance with the example embodiments as described in the paragraphs above, the signaling comprises signaling a MAC control element towards the communication network, and wherein the MAC control element comprises a bit map of bits configured to control whether PDCP PDU duplication should be turned on or off for each radio bearer or logical channel of the at least one radio bearer.

In accordance with the example embodiments as described in the paragraphs above there is, based on the determining, at least one of signaling the MAC control element to a wireless device of the communication network to turn on/off duplication on a downlink for an uplink radio bearer or logical channel, and signaling the MAC control element to an eNB of the communication network to turn on/off duplication for an uplink radio bearer or logical channel.

In accordance with the example embodiments as described in the paragraphs above, the MAC control element is based on indications comprising at least one of a HARQ performance indication as compared to a threshold, at least one determined gap in a received sequence of PDCP or RLC PDUs, maximum RLC retransmission number reached for a logical channel of a duplicated radio bearer, received metrics indicating reliability, and latency performance as compared to a threshold.

In accordance with the example embodiments as described in the paragraphs above there is, in response to the signaled MAC control element, starting a prohibit timer to prohibit signaling of another MAC control element while the prohibit timer is running.

In accordance with the example embodiments as described in the paragraphs above, the MAC control element is applied to a subset of Secondary cells associated with the at least one radio bearer.

In accordance with the example embodiments as described in the paragraphs above, if duplication is not turned on for any Secondary cell of the subset then the MAC control element is turning on the duplication for these Secondary cells.

In accordance with the example embodiments as described in the paragraphs above, wherein the subset of at least one Secondary cell is configured to allow duplication by or through RRC signaling.

In accordance with the example embodiments as described in the paragraphs above, wherein the MAC control element turning on or off duplication for the subset of at least one Secondary cell configured to allow duplication.

In accordance with the example embodiments as described in the paragraphs above, the determining comprises determining that at least one PDCP PDU was transmitted over a radio bearer of the at least one radio bearer and has not been acknowledged.

In accordance with the example embodiments as described in the paragraphs above, the controlling comprises: controlling re-transmission of the at least one PDCP PDU over another logical channel of the at least one logical channel, wherein the re-transmission is performed in ascending order of a count value associated with the at least one PDCP PDU.

In accordance with the example embodiments as described in the paragraphs above, the at least one PDCP PDU determined to be duplicated is located in a buffer of the device.

In accordance with the example embodiments as described in the paragraphs above, the determining is based on at least one of that a radio bearer for the transmission has been added, and that duplication is enabled at the device In accordance with the example embodiments as described in the paragraphs above, the at least one PDCP PDU of the PDCP sublayer that is to be duplicated comprises only new PDCP PDU(s).

In accordance with the example embodiments as described in the paragraphs above, the indication of the duplicate at least one PDCP PDU is received by the RLC sublayer from the PDCP sublayer via a Primitive between the RLC sublayer and the PDCP sublayer.

In accordance with the example embodiments as described in the paragraphs above, the PDCP sublayer is configured by RRC to control duplication of the at least one PDCP PDU for transmission over the at least one radio bearer at least one of that a radio bearer for the transmission has been added, and that duplication is enabled at the device.

In accordance with the example embodiments as described in the paragraphs above, the signaling is to a wireless device of the communication network, and wherein the signaling is performed using RLC signaling associated with one of an AM or UM mode of a radio bearer associated with the at least one logical channel A non-transitory computer-readable medium storing program code, the program code executed by at least one processor to perform the method as described in any of the paragraphs above.

In accordance with an example embodiment of the invention as described above there is an apparatus comprising: means for determining (wireless link 11 and/or Data Path 13, DP 10A, DP 12A, and/or DP 14A, PROG 10C, PROG 12C and/or PROG 14C, and MEM 10B, MEM 12B and/or 14B as in FIG. 4) by a device of a communication network (UE 10, eNB 12, and/or NCE 14 as in FIG. 4) that at least one PDCP PDU of a PDCP sublayer is to be duplicated for transmission over at least one logical channel; means for signaling (wireless link 11 and/or Data Path 13, DP 10A, DP 12A, and/or DP 14A, PROG 10C, PROG 12C and/or PROG 14C, and MEM 10B, MEM 12B and/or 14B as in FIG. 4) an indication that the at least one PDCP PDU that is to be duplicated; and means, based on the signaling, for controlling (wireless link 11 and/or Data Path 13, DP 10A, DP 12A, and/or DP 14A, PROG 10C, PROG 12C and/or PROG 14C, and MEM 10B, MEM 12B and/or 14B as in FIG. 4) the duplication of the at least one PDCP PDU for transmission over the at least one logical channel.

In accordance with an example embodiment of the invention as described above there is an apparatus comprising: means for receiving (wireless link 11 and/or Data Path 13, DP 10A, DP 12A, and/or DP 14A, PROG 10C, PROG 12C and/or PROG 14C, and MEM 10B, MEM 12B and/or 14B as in FIG. 4), at a device of a communication network, an indication through a received signaling indicating that at least one PDCP PDU of a PDCP sublayer is to be duplicated; and means for determining (DP 10A, DP 12A, and/or DP 14A, PROG 10C, PROG 12C and/or PROG 14C, and MEM 10B, MEM 12B and/or 14B as in FIG. 4) to duplicate the at least one PDCP PDU; means for duplicating (wireless link 11 and/or Data Path 13, DP 10A, DP 12A, and/or DP 14A, PROG 10C, PROG 12C and/or PROG 14C, and MEM 10B, MEM 12B and/or 14B as in FIG. 4) the at least one PDCP PDU based on the determination; and means for transmitting (wireless link 11 and/or Data Path 13, DP 10A, DP 12A, and/or DP 14A, PROG 10C, PROG 12C and/or PROG 14C, and MEM 10B, MEM 12B and/or 14B as in FIG. 4) the duplicated PDCP PDU over at least one logical.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is may be used herein is to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
   at least one processor; and
   at least one memory including computer program code, where the at least one memory and the computer program code are configured, with the at least one processor, to cause the apparatus to at least:
   receive an indication through a received medium access control control element indicating that at least one packet data convergence protocol protocol data unit of a packet data convergence protocol sublayer is to be duplicated;
   determine to duplicate the at least one packet data convergence protocol protocol data unit based on the received indication;
   duplicate the at least one packet data convergence protocol protocol data unit based on the determination; and
   transmit the duplicated packet data convergence protocol protocol data unit over at least one logical channel,
   wherein the received medium access control control element is based on indication comprising at least one of a hybrid automatic repeat request performance indication as compared to a threshold, at least one determined gap in a received sequence of packet data convergence protocol or radio link control protocol data units, maximum radio link control retransmission number reached for a logical channel of a duplicated radio bearer, received metrics indicating reliability, or latency performance as compared to a threshold.

2. The apparatus of claim 1, wherein the indication is per packet data convergence protocol protocol data unit or per logical channel.

3. The apparatus of claim 1, wherein the medium access control control element comprises a bit map of bits configured to control whether packet data convergence protocol protocol data unit duplication should be turned on or off for each radio bearer or logical channel of the at least one logical channel.

4. The apparatus of claim 3, wherein the at least one memory including the computer program code is configured with the at least one processor to cause the apparatus, in response to the received medium access control control element, to start a prohibit timer to prohibit signaling of another medium access control control element while the prohibit timer is running.

5. The apparatus of claim 3, wherein the medium access control control element is applied to a subset of at least one secondary cell associated with the radio bearer.

6. The apparatus of claim 5, wherein the subset of at least one secondary cell is configured to allow duplication by radio resource control signaling.

7. The apparatus of claim 6, wherein the medium access control control element turning on duplication for the subset of at least one secondary cell configured to allow duplication.

8. The apparatus of claim 1, wherein the at least one packet data convergence protocol protocol data unit determined to be duplicated is located in a buffer of a wireless device.

9. The apparatus of claim 1, wherein the determining is based on at least one of that a logical channel for the transmission has been added, or that duplication is enabled at a wireless device.

10. The apparatus of claim 1 comprises a wireless device or base station.

11. An apparatus comprising:
   at least one processor; and
   at least one memory including computer program code, where the at least one memory and the computer program code are configured, with the at least one processor, to cause the apparatus to at least:
   determine that at least one packet data convergence protocol protocol data unit of a packet data convergence protocol sublayer is to be duplicated for transmission over at least one logical channel;
   and
   based on the determining, control duplication of the at least one packet data convergence protocol protocol data unit for transmission over the at least one logical channel,
   wherein the determination is based on indication comprising at least one of a hybrid automatic repeat request performance indication as compared to a threshold, at least one determined gap in a received sequence of packet data convergence protocol or radio link control protocol data units, maximum radio link control retransmission number reached for a logical channel of a duplicated radio bearer, received metrics indicating reliability, or latency performance as compared to a threshold.

12. The apparatus of claim 11, where the at least one memory and the computer program code are configured, with the at least one processor, to cause the apparatus to at least: signal an indication of the at least one packet data convergence protocol protocol data unit that is to be duplicated,
   wherein the signaling comprises a medium access control control element, and wherein the medium access control control element comprises a bit map of bits configured to control whether packet data convergence protocol protocol data unit duplication should be turned on or off for each radio bearer or logical channel of the at least one logical channel.

13. The apparatus of claim 12, wherein the at least one memory including the computer program code is configured with the at least one processor to cause the apparatus, based on the determining, to at least one of signal the medium access control control element to a wireless device of a communication network to turn on or off duplication for an uplink radio bearer or logical channel, or signal the medium access control control element to a base station of the communication network to turn on or off duplication on an uplink radio bearer or logical channel.

14. The apparatus of claim 12, wherein the medium access control control element is applied to a subset of at least one secondary cell associated with the radio bearer.

15. The apparatus of claim 12, wherein the at least one memory and the computer program code are configured, with the at least one processor, to cause the apparatus, in response to the signaling the medium access control control element, to start a prohibit timer to prohibit signaling of another medium access control control element while the prohibit timer is running.

16. The apparatus of claim 12, wherein the medium access control control element is applied to a subset of at least one secondary cell associated with the radio bearer.

17. The apparatus of claim 11 comprises a wireless device or base station.

18. The apparatus of claim 11, the at least one memory and the computer program code are configured, with the at least one processor, to cause the apparatus to signal an indication of the at least one packet data convergence protocol protocol data unit that is to be duplicated.

19. The apparatus of claim 11, wherein the determining comprises determining that at least one packet data convergence protocol protocol data unit was transmitted over a logical channel of the at least one logical channel and has not been acknowledged.

20. The apparatus of claim 11, wherein the at least one packet data convergence protocol protocol data unit determined to be duplicated is located in a buffer of a wireless device.

21. An apparatus comprising:
   at least one processor; and
   at least one memory including computer program code, where the at least one memory and the computer program code are configured, with the at least one processor, to cause the apparatus to at least:
   determine at least one packet data convergence protocol protocol data unit of a packet data convergence protocol sublayer is to be duplicated; signal an indication through a medium access control control element indicating the at least one packet data convergence, protocol protocol data unit is to be duplicated based on the determination; and
   receive a duplication of the at least one packet data convergence protocol protocol data unit over at least one logical channel as a response to the signaling,
   wherein the medium access control control element is based on indication comprising at least one of a hybrid automatic repeat request performance indication as compared to a threshold, at least one determined gap in a received sequence of packet data convergence protocol or radio link control protocol data units, maximum radio link control retransmission number reached for a logical channel of a duplicated radio bearer, received metrics indicating reliability, or latency performance as compared to a threshold.

* * * * *